Oct. 12, 1926.

W. McARTHUR, JR 1,602,690

AUTOMOBILE RADIATOR BAIL CAP

Filed July 16, 1924

Inventor
Warren McArthur Jr

By Munday Clarke & Carpenter
his Attorneys

Patented Oct. 12, 1926.

1,602,690

UNITED STATES PATENT OFFICE.

WARREN McARTHUR, JR., OF PHOENIX, ARIZONA.

AUTOMOBILE RADIATOR BAIL CAP.

Application filed July 16, 1924. Serial No. 726,238.

This invention relates in general to improvements of general utility in radiator construction, and more particularly relates to improvements in construction and operation of the closures for filler openings of automobile radiators, etc.

Objects of the invention are the provision of a cap for closing the filler openings of automobile radiators which can be positioned on, or lifted off its seat without requiring the operator to touch the hot cap itself; the provision of a construction in which the cap will be automatically raised or lowered by merely operating the customary locking wire now in general use, thereby avoiding any chance of the operator burning his hands in opening or closing the radiator neck; the provision of such a construction which is easily and inexpensively manufactured and readily operable without danger of mishap by ordinary users, and such other objects and advantages of the invention as may be found to obtain in the structure hereinafter set forth and claimed.

In the accompanying drawings, forming a part of this specification, and showing, for purposes of exemplification, a preferred form and manner in which the invention may be embodied and practiced, but without limiting the claimed invention specifically to such illustrative instance or instances:

Figure 2:
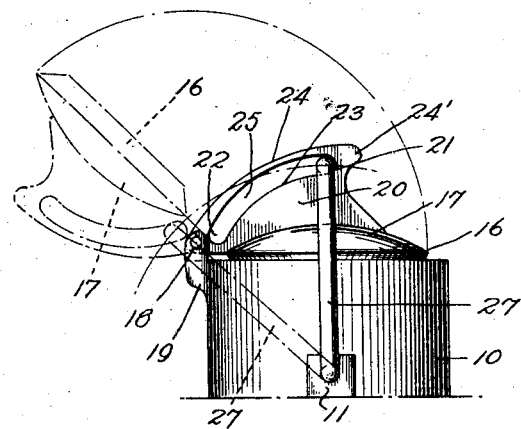
Fig. 2 is a side elevational view of the same.
Figure 3:
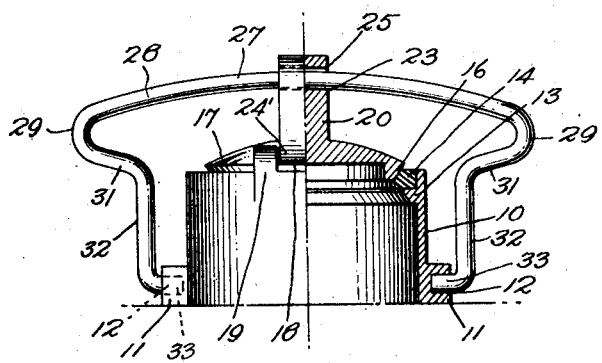
Fig. 3 is a view, part in front elevation, and part in vertical cross-section taken on the line 3—3 of Fig. 1, of the same.
Figure 1:
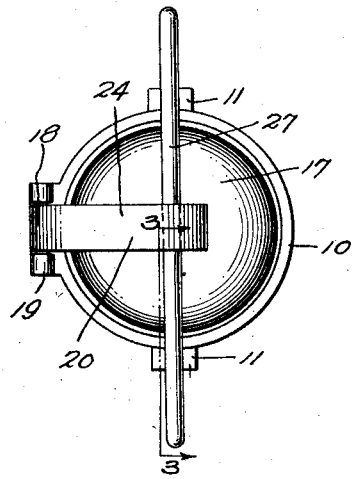
Figure 1 is a top plan view of a radiator neck closure construction embodying the invention.

Referring to the drawings, the invention is there illustrated as embodied in a construction consisting of a cylindrical radiator neck 10, having on its outer surface, towards the lower portion, oppositely disposed projections 11 provided with apertures 12 therein.

At its upper end the neck is provided interiorly with an annular flange 13, upon which is seated an annular gasket 14, that provides a seat for the inclined seating surface 16 of the radiator cap or closure 17.

The cap 17 is hinged at 18 to the front 19 of the neck, and upon its upper outer face is provided with a curved upwardly projecting rib 20. The upper portion 21 is disposed at a higher level than the hinged end portion 22 of the rib to provide a cam surface 23. The rib has also formed integral with it an outer curved wall 24 which is connected at each end 24' with the rib 20, but is spaced from the rib to provide a curved slot 25, through which a portion of a holding down bale or wire 27 extends. The bale consists of an elongated top portion 28 terminating at each end in depending portions 29, curved inwardly at 31, and the portions 31 are bent to form depending portions 32 having transversely extending ends 33 that fit in the apertures 12 in the projections 11 to form bearings or hinges for the locking wire.

The cap is shown on the drawings as in closed position, and to raise the cap off its seat without touching the hands to it when it is very hot the operator takes hold of the ends 29 of the locking wire and draws it toward the lower hinged edge of the slot which causes the wire to ride over the cam surfaces and against the top wall 24 which causes the cap to be lifted off its seat, as shown in dotted lines in Fig. 2. To close the cap against the seat, the locking wire is pushed back over the cam surface 23 and the cap automatically seats on the gasket 14.

The invention as hereinabove set forth is embodied in a particular form of construction but may be variously embodied within the scope of the claims hereinafter made.

I claim:

1. A radiator neck closure comprising, in combination: a hinged cap; a seat for said cap; said cap having a raised portion providing a curved slot; a hinged locking wire extending through said slot, said wire being adapted to simultaneously raise and move said cap about its hinge when said wire is drawn toward the hinge of said cap.

2. A radiator neck closure comprising, in combination: a hinged cap; said cap having a raised portion providing a curved slot; a hinged locking wire extending through said slot; one portion of said slot being disposed higher than the remainder of said slot; said wire being adapted to automatically lift and move said cap off the neck when said wire is drawn to unlock said cap.

3. A radiator neck closure comprising, in combination: a hinged cap; a seat therefor; a slotted cam surface on said cap; a hinged locking wire extending through said slot and slidably engaging both surfaces of said slot simultaneously and adapted to automatically raise and move said cap towards and away from its seat when said locking wire is moved in its slot.

4. A radiator neck closure comprising, in combination: a cap; a seat therefor; a slotted cam surface on said cap; a hinged locking wire extending through said slot and slidably engaging both surfaces of said slot simultaneously and adapted to automatically raise and move said cap towards and away from its seat when said locking wire is moved in its slot.

5. A radiator neck closure comprising, in combination: a hinged cap; a seat therefor; a cam surface thereon; a hinged locking wire slidable on said cam surface and adapted to move said cap to and from its seat when the locking wire is sliding over said cam surface.

6. A radiator neck closure comprising, in combination: a cap; a seat therefor; a cam surface thereon; a hinged locking wire slidable on said cam surface and adapted to move said cap to and from its seat when the locking wire is sliding over said cam surface.

7. A radiator neck closure comprising, in combination: a cap; said cap having a raised portion providing a curved slot; a hinged locking wire extending through said slot; one portion of said slot being disposed higher than the remainder of said slot; said wire being adapted by means of its being in sliding contact with both edges of the curved slot simultaneously to automatically lift said cap off the neck when said wire is drawn to unlock said cap.

8. A radiator neck closure comprising, in combination: a cap; a seat therefor; a hinged bail engageable with said cap; said bail being adapted to lift and maintain said cap in position to accurately seat when moved about its hinged bearings.

9. A radiator neck closure comprising, in combination: a hinged cap; a seat therefor; a bail engageable with said cap; said bail being adapted to lift and maintain said cap in position to accurately seat when said bail is moved about its bearings.

In witness whereof I have hereunto set my hand.

WARREN McARTHUR, Jr.